United States Patent [19]
Ichikawa et al.

[11] Patent Number: 5,948,989
[45] Date of Patent: Sep. 7, 1999

[54] PRESSURE SENSOR DEVICE

[75] Inventors: Junichi Ichikawa; Etsuo Nishimura, both of Tokyo, Japan

[73] Assignee: Mitsubishi Denki Kabushiki Kaisha, Toyko, Japan

[21] Appl. No.: 08/989,866

[22] Filed: Dec. 12, 1997

[30] Foreign Application Priority Data

Aug. 29, 1997 [JP] Japan .................................. 9-234658

[51] Int. Cl.⁶ .............................. G01L 19/04; G01L 9/00
[52] U.S. Cl. ............................................... 73/708; 73/717
[58] Field of Search ........................... 73/708, 706, 756, 73/717, 723, 720, 721, 727; 374/144, 145

[56] References Cited

U.S. PATENT DOCUMENTS

| | | | |
|---|---|---|---|
| 4,797,007 | 1/1989 | Elmore, III | 374/143 |
| 4,914,954 | 4/1990 | Zlamal | 73/756 |
| 5,386,730 | 2/1995 | Ikeda et al. | 73/706 |
| 5,661,244 | 8/1997 | Nishimura et al. | 73/706 |

*Primary Examiner*—Richard Chilcot
*Assistant Examiner*—Abdullahi Aw-Musse
*Attorney, Agent, or Firm*—Sughrue, Mion, Zinn, Macpeak & Seas, PLLC

[57] ABSTRACT

Disclosed is a pressure sensor device including a temperature sensor, which can reduce the number of places required for mounting necessary sensors and can simplify a structure. The pressure sensor device comprises a housing including a connector portion provided at an outer periphery thereof, molded integrally with a plurality of external terminals and disposed to cover the pressure sensor from above, and a resin-made base cooperating the housing to define a container space for containing a pressure sensor and a circuit board. The base includes a pressure introducing passage, a temperature sensor containing projection with the temperature sensor installed therein, work holes into which are inserted the other ends of some of the external terminals, and intermediate terminals fixed to said base and having one ends electrically connected to leads of the temperature sensor, the intermediate terminals being partly exposed in the work holes and electrically connected to the other ends of the external terminals inserted into the work holes.

11 Claims, 3 Drawing Sheets

PRESSURE SENSOR DEVICE

BACKGROUND OF THE INVENTION

1. Field of the Invention

The present invention relates to a pressure sensor device for detecting the pressure of an object to be measured, and more particularly to a pressure sensor device which is combined with a temperature sensor for also detecting the temperature of the measured object.

2. Description of the Related Art

Figure 5:
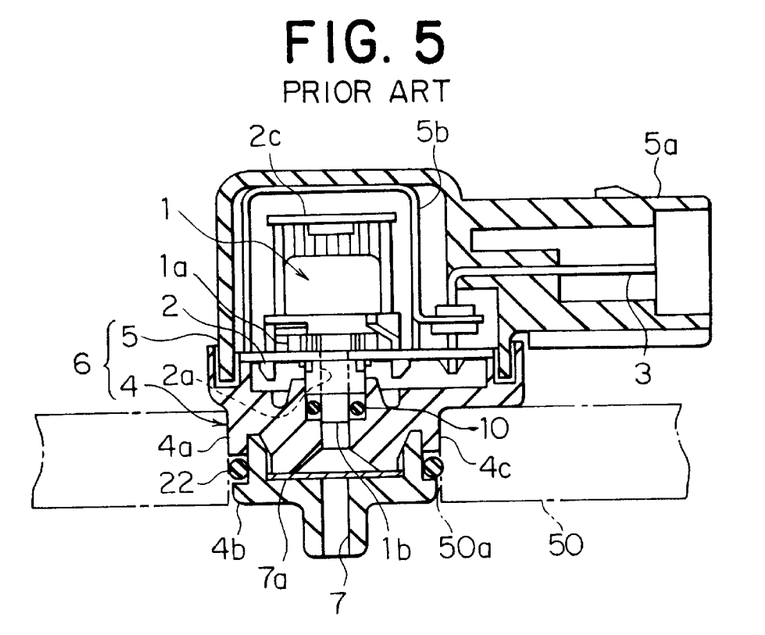
FIG. 5 is a sectional view of a conventional pressure sensor device.

FIG. 5 is a sectional view of a conventional pressure sensor device disclosed in, e.g., Japanese Unexamined Patent Publication No. 6-281519. In FIG. 5, a pressure sensor 1 is mounted on a circuit board 2 such that leads 1a projecting from one side of the pressure sensor 1 are soldered to the circuit board 2. A pressure reference chamber (not shown) is air-tightly formed inside the pressure sensor 1. A pressure detecting element (not shown) which also air-tightly forms a pressure introducing chamber is disposed in the pressure reference chamber. A pipe 1b extending out of the pressure sensor 1 is connected to the pressure introducing chamber. The pipe 1b introduces the pressure of an object to be measured, e.g., air, to the pressure introducing chamber. The pressure detecting element is deformed depending on a pressure difference between the pressure introducing chamber and the pressure reference chamber. An amount of the resulting deformation is converted into an electrical signal indicating the pressure of the measured object and is then output to the exterior through the leads 1a.

The pressure sensor 1 is mounted on the circuit board 2 with the pipe 1b penetrating a through hole 2a bored in the circuit board 2. Above the circuit board 2, there is another ceramic circuit board 2c being U-shaped in section and disposed to cover the pressure sensor 1. Output terminals 3 for delivering an output signal of the pressure sensor 1 to the exterior are extended from one end of the circuit board 2. An assembly of the circuit board 2 and the pressure sensor 1 is placed on a base 4 with an outer peripheral portion of the circuit board 2 supported by the base 4, and is further covered by a resin-made, box-shaped housing 5. Both the base 4 and the housing 5 jointly constitute a sensor container 6 for containing the above assembly.

The pressure sensor 1 and the ceramic circuit board 2c are installed in a space defined by the base 4 and the housing 5, i.e., an inner space of the sensor container 6, in such a state as not contacting the container. Between the housing 5 and the ceramic circuit board 2c, a box-shaped shield cover 5b is disposed so as to cover the ceramic circuit board 2c. A peripheral edge of the shield cover 5b is entirely brought into abutment with the outer peripheral portion of the circuit board 2, while a top portion of the shield cover 5b on the opposite side is brought into abutment with an inner wall of the housing 5, thereby pressing the circuit board 2 to the base 4 from above for positioning of the circuit board 2. Part of an edge portion of the shield cover 5b is extended for connecting to the external terminals 3 for grounding therethrough.

A connector portion 5a for connection to an external connector (not shown) is formed at one side of the housing 5. The external terminals 3 are embedded and supported in the center of the connector portion 5a. A pressure introducing passage 7 is formed through the base 4 and connected to the pipe 1b. A filter 7a is disposed midway along the pressure introducing passage 7. To grip the filter 7a from both sides, the base 4 is divided into two members 4a, 4b in the axial direction of the pressure introducing passage 7 (in the vertical direction in FIG. 5). The members 4a, 4b support the filter 7a in place by gripping it from above and below. A portion of the pressure introducing passage 7 formed in the member 4a on the side facing the filter 7a is flared into a conical shape for the purpose of enabling the measured object to pass the filter 7a in a sufficient amount. The pressure introducing passage 7 is air-tightly connected to the pipe 1b with an O-ring 10 fitted over the pipe 1b.

An attachment surface 4c is formed in the base 4 and the pressure sensor device is supported at the attachment surface 4c and attached in a predetermined place. An O-ring 22 is fitted over the attachment surface 4c.

The conventional pressure sensor device having the above-explained structure is attached to an attachment hole 50a bored in a wall of an engine intake system 50, for example, such that the base 4 is inserted in the attachment hole 50a, the attachment surface 4c is engaged with a peripheral edge of the attachment hole 50a, and the boundary between the attachment surface 4c and the attachment hole 50a is sealed by the O-ring 22. After being thus attached, the pressure sensor device measures the pressure in the engine intake system.

Figure 6:
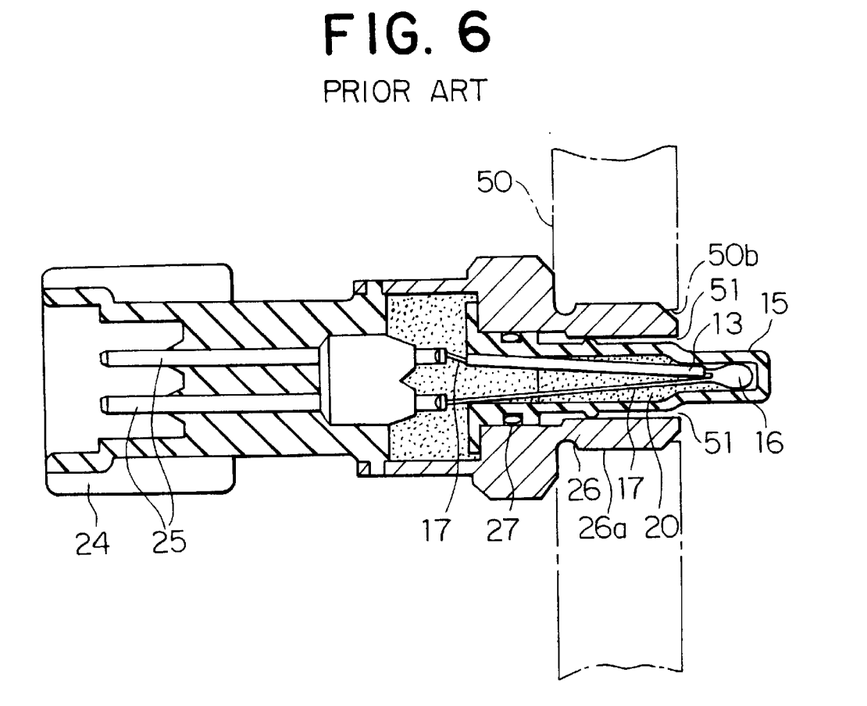
FIG. 6 is a view showing the structure of a conventional temperature sensor device.

Further, FIG. 6 is a view showing the structure of a conventional temperature sensor device disclosed in, e.g., Japanese Unexamined Utility Model Publication No. 4-30448. In FIG. 6, a thermistor 16 used as a heat sensitive element is contained in a holder 15 and sealed by a resin 20 filling the surrounding of the thermistor 16. Two leads 17, 17 are connected to the thermistor 16, and one lead 17 is covered by a tube 13 for insulating the leads 17, 17 from each other. The temperature signal detected by the thermistor 16 is output to the exterior from terminals 25 embedded in a connector 24. A housing 26 supports the holder 15 and the connector 24, and has a threaded portion 26a formed in its outer peripheral surface for attachment of the temperature sensor device to a predetermined position. Between the housing 26 and the holder 15, an O-ring 27 is disposed to seal an object to be measured from the open air.

The conventional temperature sensor device having the above-explained structure is attached to an attachment hole 50b bored in a wall of an engine intake system 50, for example, such that the threaded portion 26a formed in the outer peripheral surface of the housing 26 is fastened into the attachment hole 50b to close it. After being thus attached, the temperature sensor device detects the temperature of the measured object.

Because the conventional pressure sensor device and temperature sensor device are constructed as explained above, separate sensor devices have been necessary to detect the pressure and temperature of the measured object. This has resulted in the problems of requiring individual attachment of the separate sensor devices to the engine intake system 50, for example, to the respective attachment holes 50a, 50b, as well as requiring external connectors and connecting wires specific to the separate sensor devices for supplying electrical power and outputting signals. In addition, external covering parts and internal constituent parts are also required for each of the separate sensor devices. It has been therefore difficult to manufacture the separate sensor devices cost-effectively in total.

SUMMARY OF THE INVENTION

The present invention has been made with a view of solving the problems set forth above, and its object is to provide a pressure sensor device including a temperature sensor, which can reduce the number of places required for mounting necessary sensors. Another object is to provide a pressure sensor device which can simplify a structure and can make assembly work so easy as to realize automatic assembly.

A pressure sensor device according to a first aspect of the present invention comprises: a pressure sensor including a pressure detecting element which is disposed to define an enclosed pressure reference chamber and an enclosed pressure introducing chamber within an enclosure and is deformed depending on a pressure difference between the pressure reference chamber and the pressure introducing chamber for detecting the pressure of an object introduced into the pressure introducing chamber to be measured, a pipe connected to the pressure introducing chamber for introducing said object to be measured into the pressure introducing chamber from the exterior, and leads for outputting an output of the pressure detecting element to the exterior; a circuit board on which the pressure sensor is mounted; a temperature sensor including a heat sensitive element for detecting the temperature of said object and a pair of leads for transferring an output of the heat sensitive element to the exterior; a housing including a connector portion provided at an outer periphery thereof, molded integrally with a plurality of external terminals such that the plurality of external terminals have one end extended out into the connector portion and the other end extended to the interior of the housing, and disposed to cover the pressure sensor from above, the other ends of some of the external terminals being electrically connected to the circuit board, the other ends of some of the external terminals penetrating the circuit board and extending downward; and a resin-made base attached to the housing from below to define, jointly with the housing, a container space for containing the pressure sensor and the circuit board, the base including a pressure introducing passage which has one end air-tightly connected to the pipe and the other end open to the exterior, a temperature sensor containing projection projected from the vicinity of the opening of the pressure introducing passage with the temperature sensor installed therein, work holes into which are inserted the other ends of those external terminals penetrating the circuit board and extending downward, and intermediate terminals having one end electrically connected to the leads of the temperature sensor, the intermediate terminals being partly exposed in the work holes and electrically connected to the other ends of those external terminals inserted into the work holes.

In a pressure sensor device according to a second aspect, the intermediate terminals serve as means for fixing the temperature sensor in the temperature sensor containing projection.

In a pressure sensor device according to a third aspect, the temperature sensor is in the form of a temperature sensor body formed by sealing the leads of the temperature sensor with a resin into a one-piece solid structure while extending and exposing the heat sensitive element apart from the temperature sensor body.

In a pressure sensor device according to a fourth aspect, the temperature sensor body is insert-molded into the base, to be integrally installed in the temperature sensor containing projection.

A pressure sensor device according to a fifth aspect comprises a pressure sensor including a pressure detecting element which is disposed to define an enclosed pressure reference chamber and an enclosed pressure introducing chamber within an enclosure and is deformed depending on a pressure difference between the pressure reference chamber and the pressure introducing chamber for detecting the pressure of an object introduced into the pressure introducing chamber to be measured, a pipe connected to the pressure introducing chamber for introducing said object to be measured into the pressure introducing chamber from the exterior, and leads for transferring an output of the pressure detecting element to the exterior; a circuit board on which the pressure sensor is mounted; a temperature sensor body formed by installing a temperature sensor, which includes a heat sensitive element for detecting the temperature of said object to be measured and a pair of leads for transferring an output of the heat sensitive element to the exterior, in a resin-made cylindrical temperature sensor container equipped bottom with the heat sensitive element positioned at the bottom of the temperature sensor container; a housing including a connector portion provided at an outer periphery thereof, molded integrally with a plurality of external terminals such that the plurality of external terminals have one end extended out into the connector portion and the other end extended to the interior of the housing and disposed to cover the pressure sensor from above, the other ends of some of the external terminals being electrically connected to the circuit board, the other ends of some of the external terminals penetrating the circuit board and extending downward; and a resin-made base attached to the housing from below to define, jointly with the housing, a container space for containing the pressure sensor and the circuit board, the base including a pressure introducing passage which has one end air-tightly connected to the pipe and the other end open to the exterior, a fitting hole which is bored in adjacent relation to the pressure introducing passage and into which the temperature sensor body is fitted with the bottom side thereof extending out to the exterior, work holes into which are inserted the other ends of those external terminals penetrating the circuit board and extending downward, and intermediate terminals having one ends electrically connected to the leads of the temperature sensor, the intermediate terminals being partly exposed in the work holes and electrically connected to the other ends of those external terminals inserted into the work holes.

In a pressure sensor device according to a sixth aspect, the intermediate terminals are insert-molded in the base.

In a pressure sensor device according to a seventh aspect, the intermediate terminals are fixed to the base by heat caulking.

In a pressure sensor device according to an eighth aspect, the intermediate terminals are fixed to the temperature sensor body.

In a pressure sensor device according to a ninth aspect, the work holes are bored to vertically penetrate the base for connecting the container space and the exterior below the base with each other, and openings of the work holes, open at the underside of the base, are resin-sealed after the external terminals and the intermediate terminals have been electrically connected to each other.

In a pressure sensor device according to a tenth aspect, the work holes include conical portions with large-diameter ends formed to face the container space, and the intermediate terminals and the external terminals come close to each other in positions near small-diameter ends of the conical portions and are soldered in those positions for electrical connection.

In a pressure sensor device according to an eleventh aspect, one of the leads of the temperature sensor is electrically connected to a circuit pattern formed on the circuit board through one of the corresponding external terminals, and the circuit board is configured such that the one lead of the temperature sensor can be alternatively connected to one of a power supply terminal and a ground terminal by selectively short-circuiting between predetermined points on the circuit pattern with a short-circuit member.

DESCRIPTION OF THE PREFERRED EMBODIMENTS

Embodiment 1

Figure 1:
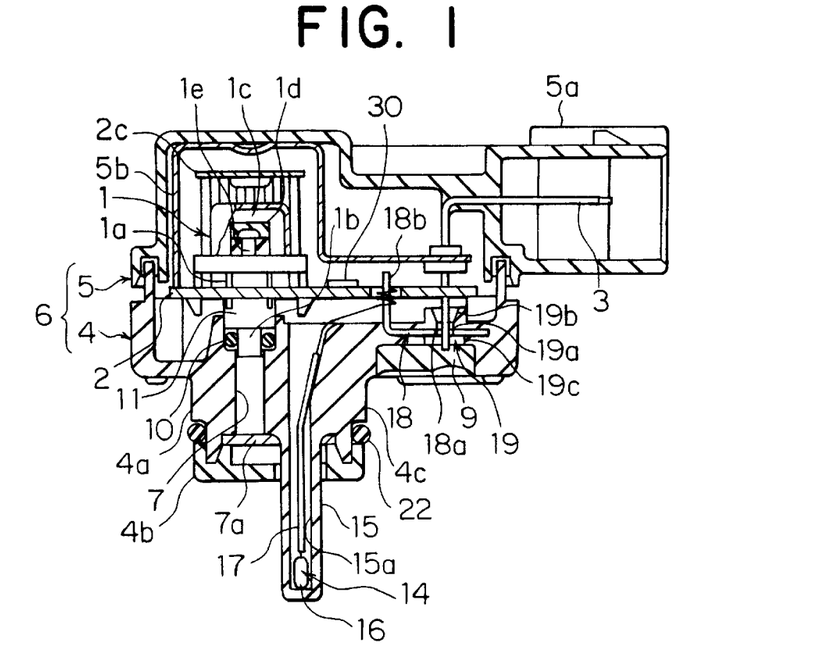
FIG. 1 is a sectional view of one embodiment of a pressure sensor device of the present invention.

FIG. 1 is a sectional view of one embodiment of a pressure sensor device of the present invention. In FIG. 1, a pressure sensor 1 is mounted on a circuit board 2 such that leads 1a projecting from one side of the pressure sensor 1 are soldered to the circuit board 2. A pressure reference chamber 1c is air-tightly formed inside the pressure sensor 1. At the center of the reference chamber 1c, a silicon-molded, box-shaped pressure detecting element 1d is fixedly disposed while being air-tightly sealed at its peripheral edge. An air-tight pressure introducing chamber 1e is formed inside the pressure detecting element 1d. The pressure detecting element 1d includes a diaphragm portion formed by thinning part of a wall, and a gauge resistor is formed in the vicinity of the diaphragm portion. A pipe 1b extending out of the pressure sensor 1 is connected to the pressure introducing chamber 1e. The pipe 1b introduces the pressure of an object to be measured, e.g., air, to the pressure introducing chamber 1e. The diaphragm portion of the pressure detecting element 1d is deformed depending on a pressure difference between the pressure introducing chamber 1e and the pressure reference chamber 1c. An amount of the resulting deformation is proportional to the pressure of the measured object. The gauge resistor changes its resistance value upon the deformation of the diaphragm portion, and outputs a voltage value in proportion to the resulting resistance value, as the pressure of the measured object, to the exterior through the leads 1a.

The pressure sensor 1 is mounted on the circuit board 2 with the pipe 1b penetrating a through hole bored in the circuit board 2. Above the circuit board 2, there is another ceramic circuit board 2c being U-shaped in section and disposed to cover the pressure sensor 1. An assembly of the circuit board 2 and the pressure sensor 1 is placed on a base 4 with an outer peripheral portion of the circuit board 2 supported by the base 4, and is further covered by a box-shaped housing 5. A peripheral edge of the housing 5 is bonded to the base 4. The base 4 and the housing 5 are both made of resin and jointly constitute a sensor container 6 for containing the above assembly. The pressure sensor 1 is installed in a space defined inside the sensor container 6 in such a state as not contacting the container. Between the housing 5 and the pressure sensor 1, a box-shaped shield cover 5b is disposed so as to cover the pressure sensor 1. A peripheral edge of the shield cover 5b is entirely brought into abutment with the outer peripheral portion of the circuit board 2, while a top portion of the shield cover 5b on the opposite side is brought into abutment with an inner wall of the housing 5, thereby pressing the circuit board 2 to the base 4 from above in FIG. 1 for positioning of the circuit board 2.

A connector portion 5a for connection to an external connector (not shown) is formed at one side of the housing 5. A plurality of external terminals 3 are embedded and supported in the center of the connector portion 5a side by side in the direction shown vertically in FIG. 1. The plurality of external terminals 3 all have one end projected into the connector portion 5a, and the other ends all extend into the sensor container 6. The other ends of the external terminals 3 extending into the sensor container 6 penetrate an edge portion of the shield cover 5b and then further extend to the position of the circuit board 2. Some ends of the external terminals 3 are soldered to the circuit board 2, while some others penetrate the circuit board 2 and then still further extend downward as shown in FIG. 1. Certain ones of the other external terminal ends penetrating the circuit board 2 are soldered to the circuit board 2 at the position where they penetrate it. The remaining ends penetrate the circuit board 2 without making electrical connection therewith. These ends of the external terminals 3 having penetrated the circuit board 2 even further extend downward in FIG. 1 and are connected to an intermediate terminal 18 described later.

A pressure introducing passage 7 connected to the pipe 1b for introducing the pressure of the measured object to the pipe 1b is formed through the base 4. A filter 7a is disposed midway along the pressure introducing passage 7. To grip the filter 7a from both sides, the base 4 is divided into two members 4a, 4b in the axial direction of the pressure introducing passage 7 (in the vertical direction shown in FIG. 1). The members 4a, 4b support the filter 7a in place by gripping it from above and below. A portion of the pressure introducing passage 7 formed in the member 4b on the side facing the filter 7a has a larger inner diameter for the purpose of enabling the measured object to pass the filter 7a in a sufficient amount. The pressure introducing passage 7 is air-tightly connected to the pipe 1b with an O-ring 10 fitted over the pipe 1b. The O-ring 10 is positioned by a holder 11 disposed between the O-ring 10 and the circuit board 2.

The base 4 includes a temperature sensor containing projection 15 integrally formed adjacent the pressure introducing passage 7 and extending downward as shown in FIG. 1. In the interior of the temperature sensor containing projection 15, a deep hole is bored to extend from above along the center axis of the projection 15 in the direction parallel to the pressure introducing passage 7, thereby providing a hollow portion 15a. The hollow portion 15a is formed by cutting the interior of the temperature sensor containing projection 15 such that a side wall and a bottom wall are left in a predetermined thickness.

A temperature sensor 14 is installed in the hollow portion 15a. The temperature sensor 14 comprises a thermistor 16, i.e., a heat sensitive element, disposed near the bottom of the hollow portion 15a and a pair of leads 17 extending from the thermistor 16. The thermistor 16 senses the temperature of the measured object through the side wall of the temperature sensor containing projection 15, converts the sensed temperature into an electrical signal, and then outputs it to the exterior.

A predetermined number of intermediate terminals 18 are embedded in the base 4 at positions opposed to the circuit board 2. At the same time as when the base 4 is molded, the intermediate terminals 18 are insert-molded to be fixedly embedded in the base 4 as integral parts. In respective positions where the intermediate terminals 18 are embedded, work holes 19 are bored to penetrate the base 4 downward from the side of the circuit board 2. Each of the work holes 19 comprises a small-diameter portion 19a formed in its intermediate portion and relatively narrowed to have an inner diameter a little greater than the external terminal 3, a conical portion 19b formed on one side of the small-diameter portion 19a near the circuit board 2 to have a conical shape with its large-diameter end facing the circuit board 2, a large-diameter portion 19c formed below the small-diameter portion 19a to have a greater inner diameter than the small-diameter portion 19a, and an enclosed portion 19d formed below the large-diameter portion 19c, allowing the work hole 19 to be resin-sealed there by a sealing resin 9. An intermediate portion 18a of the intermediate terminal 18 is exposed in the work hole 19 at the position of the boundary between the small-diameter portion 19a and the large-diameter portion 19c, and one end 18b thereof is projected from the base 4 toward the circuit board 2.

Ends of the leads 17 of the temperature sensor 14 are each wound over the projected end 18b of the intermediate terminal 18 and then electrically connected thereto by soldering. The ends of the leads 17 are connected to the intermediate terminals 18 for electrical connection of the temperature sensor 14, while the temperature sensor 14 is positioned and fixed in a predetermined position within the hollow portion 15a. In other words, the intermediate terminals 18 serve as means for fixing the temperature sensor 14. A through hole is bored in a portion of the circuit board 2 where the projected end 18b is positioned, so that the circuit board 2 does not contact the projected end 18b and the lead 17. On the other hand, the external terminal 3, having penetrated the circuit board 2, extends through the work hole 19 and intersects the intermediate portion 18a of the intermediate terminal 18 in the small-diameter portion 19a of the work hole 19. The external terminal 3 and the intermediate terminal 18 are soldered together at their intersection.

The two leads 17 extending from the thermistor 16 are connected to the corresponding intermediate terminals 18. One of the external terminals 3 connected to two of the intermediate terminals 18 is extended to reach the connector portion 5a without being electrically connected to the circuit board 2. The other external terminal 3 is soldered to the circuit board 2. A wiring pattern is formed on the circuit board 2 to connect the external terminal 3, connected to the temperature sensor 14, to a power supply terminal or a ground terminal. In general, one end of the temperature sensor 14 is connected to either the power supply terminal or the ground terminal depending on a difference in circuit configuration. The wiring pattern is formed on the circuit board 2 beforehand in such a manner as enabling one end of the temperature sensor 14 to be connected to any of those two terminals. One of the two terminals is selected by a short-circuit member 30 for electrical connection. The temperature detected by the thermistor 16 is converted into an electrical signal and then output to the exterior through the lead 17, the intermediate terminal 18, and the external terminal 3.

An annular attachment surface 4c is formed along an outer peripheral portion of the base 4. An O-ring 22 is disposed to fit over the attachment surface 4c in the circumferential direction. The pressure sensor device is attached to an attachment hole formed in an engine intake system (not shown) such that its portion lower than the O-ring 22 as shown in FIG. 1, is inserted through and projected out of the attachment hole downward with the O-ring 22 sealing the boundary therebetween. The pressure sensor device is attached substantially in a vertical posture where the pressure introducing passage 7 and the temperature sensor containing projection 15 are directed downward.

The pressure sensor device thus constructed is assembled in accordance 25 with the following sequence. First, the pressure sensor 1 is mounted on the circuit board 2 by soldering. Then, the assembly of the circuit board 2 and the pressure sensor 1 is installed in the housing 5, in which the external terminals 3 have been embedded, upon molding of the housing 5, with the shield cover 5b having been set beforehand. At this time, the external terminals 3 in the predetermined number are arranged to penetrate the circuit board 2. Also, those external terminals 3 related to outputting of the detection signal from the pressure sensor 1, including the power supply terminal and the ground terminal, are soldered to the wiring pattern formed on the circuit board 2.

The temperature sensor 14 is inserted into the hollow portion 15a of the base 4 in which the intermediate terminals 18 have been embedded upon molding of the base 4. At this time, since the hollow portion 15a is tapered to have a wide opening end, it is easy to install the temperature sensor 14 in the hollow portion 15a. After that, the ends of the leads 17 are wound over the projected ends 18b of the intermediate terminals 18 and soldered thereto. After arranging the O-ring 10, etc. in the predetermined positions, the housing 5 and the base 4 are joined together and bonded at their joined periphery for air-tight sealing. When the external terminals 3 are inserted into the corresponding work holes 19, they are guided by the conical portions 19b so as to penetrate the work holes 19. Thus, the insertion of the external terminals 3 into the work holes 19 is facilitated by the presence of the conical portions 19b. A soldering tool is then inserted through the work holes 19 for soldering the intermediate terminals 18 and the external terminals 3 to each other. This soldering step can be easily performed because the solders applied to interconnect the intermediate terminals 18 and the external terminals 3 and leaked to the side of the circuit board 2 are pooled in the conical portions 19b to avoid a short circuit between an adjacent two of the external terminals 3. The enclosed portions 19d are finally sealed by the sealing resin 9, thereby completing the pressure sensor device.

The pressure sensor device having the above-explained structure is attached to the attachment hole 50a formed in the engine intake system 50 while being sealed by the O-ring 22. After being thus attached, the pressure sensor 1 detects the pressure of the measured object and the temperature sensor 14 detects the temperature of the measured object in the vicinity of the pressure detecting position.

In the pressure sensor device having the above-explained structure, since the pressure sensor 1 and the temperature sensor 14 are both packaged in one sensor container 6, only one mount position (attachment hole 50a) is required to attach two different types of sensors to the engine intake system, etc. Additionally, since the number of external covering parts and common internal constituent parts can be reduced, the pressure sensor device can be manufactured at a lower total cost.

Also, the temperature sensor 14 is fixed to the base 4 in a condition where the leads 17 have been connected to the intermediate terminals 18 beforehand, then covered by the housing 5 to be installed in the sensor container 6, and thereafter electrically connected to the external terminals 3 by soldering through the work holes 19 bored in the base 4. Compared with the method of installing and fixing the temperature sensor 14 in the container after finishing its electrical connection, therefore, the temperature sensor 14 can be surely fixed and positioned with a simple structure, and assembly work can be made so easy as to enable the pressure sensor device to be automatically assembled.

Further, since the intermediate terminals 18 are embedded in the base 4, it is possible to make the intermediate terminals 18 fixed surely and to eliminate the work of attaching the intermediate terminals 18 to the base 4 in the assembly process.

Since the work holes 19 are opened at the underside of the base 4, no water droplets stagnate in recesses of the enclosed portions 19d even if the sealing established by the sealing resin 9 is not perfect. Thus, water can be prevented from entering the interior of the sensor device, and a failure in electrical insulation can be avoided.

Moreover, since the work holes 19 include the conical portions 19b formed therein, the external terminals 3 can be easily inserted into the work holes 19 while being guided by the conical portions 19b. Also, since the solders applied to interconnect the external terminals 3 and the intermediate terminals 18 and leaked to the side of the circuit board 2 are pooled in the conical portions 19b to avoid a short circuit between adjacent two of the external terminals 3, the soldering step can be easily performed.

In addition, since the wiring pattern is formed on the circuit board 2 beforehand in such a manner that the temperature sensor 14 can be selectively connected to one of the power supply terminal and the ground terminal by setting the short-circuit member 30, the pressure sensor device is adaptable for two types of products with no need of changing the product structure.

Embodiment 2

Figure 2:
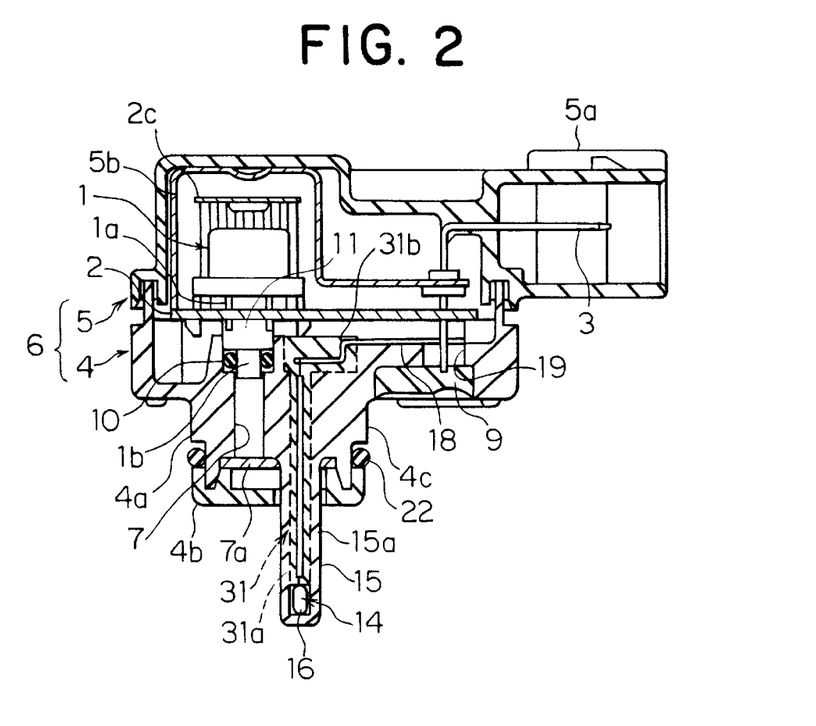
FIG. 2 is a sectional view of another embodiment of the pressure sensor device of the present invention.
Figure 3:
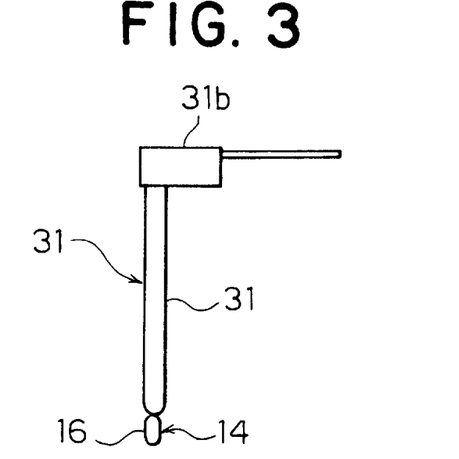
FIG. 3 is a side view of a temperature sensor body.

FIG. 2 is a sectional view of another embodiment of the pressure sensor device of the present invention. FIG. 3 is a side view of a temperature sensor body. In this embodiment, a temperature sensor 14 is molded into a temperature sensor body 31 beforehand by sealing the surrounding of the temperature sensor 14 with a resin to provide a one-piece solid structure. The temperature sensor body 31 comprises an elongate support portion 31a sealing substantially the entire length of leads 17, with a thermistor 16 exposed at its tip. A base portion 31b being in the form of a rectangle, parallelepiped and positioned on the side of the support portion 31a opposite to the thermistor 16. The ends of intermediate terminals 18 electrically connected to the leads 17 are projected from an upper side surface of the base portion 31b. The length of the support portion 31a is a predetermined value corresponding to a hollow portion 15a of the temperature sensor containing projection 15.

At the same time the base 4 is formed by using a mold, the temperature sensor body 31, including the temperature sensor 14, is insert-molded to be integral with the base 4. Ends of the intermediate terminals 18 intersect external terminals 3 in respective positions of work holes 19 bored through the base 4, and are soldered to the external terminals 3 at the intersected portions. The work holes 19 are sealed by a sealing resin 9. The other structure is the same as in the Embodiment 1.

In the pressure sensor device having the above-explained structure, since the temperature sensor body 31 is formed by sealing the surrounding of the temperature sensor 14 with a resin beforehand, the temperature sensor 14 is strong and easy to handle, which is effective in improving the yield of temperature sensors. Also, since the temperature sensor 14 is integrally embedded in the base 4 and surely positioned in place, variations in response of the individual temperature sensors 14 are eliminated and reliability is improved.

Embodiment 3

Figure 4:
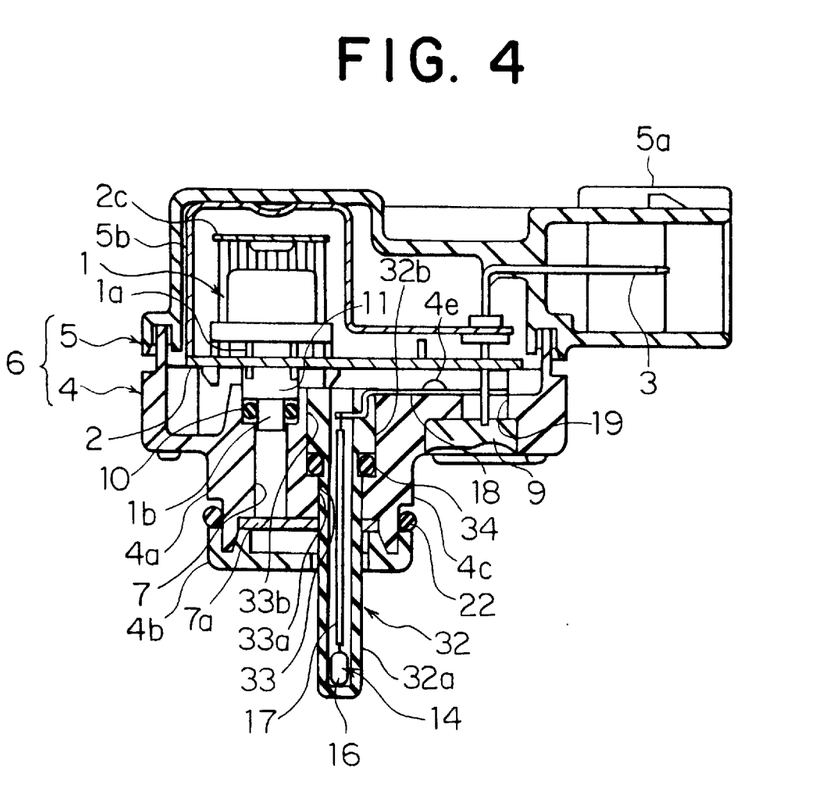
FIG. 4 is a sectional view of still another embodiment of the pressure sensor device of the present invention.

FIG. 4 is a sectional view of still another embodiment of the pressure sensor device of the present invention. In this embodiment, a temperature sensor container 32 for containing a temperature sensor 14 is molded separately from a base 4. The temperature sensor container 32 is made of a resin, and comprises a bottom-equipped cylindrical projected portion 32a enclosing substantially the entire length of leads 17 with a thermistor 16 installed at its tip, and a cylindrical base portion 32b, provided at an upper end of the projected portion 32a and having a thick wall. Intermediate terminals 18, electrically connected to the leads 17, are partly embedded in an upper region of the base portion 32b while one other ends thereof are projected from an upper side surface of the base portion 32b. The temperature sensor 14, the temperature sensor container 32, and the intermediate terminals 18 jointly constitute a temperature sensor body.

A fitting hole 33, into which the temperature sensor container 32 is fitted, is bored through the base 4 in adjacent relation to the pressure introducing passage 7. The fitting hole 33 comprises a small-diameter portion 33a and a large-diameter portion 33b formed corresponding to the projected portion 32a and the base portion 32b, respectively. The temperature sensor container 32 is press-fitted into the fitting hole 33 such that the projected portion 32a is directed to protrude outward and an O-ring 34 is held between itself and an inner surface of the fitting hole 33. The intermediate terminals 18 are fixed in place by heat-caulking projections 4e, provided on the base 4, beforehand. Ends of the intermediate terminals 18 intersect external terminals 3 in respective positions of work holes 19 bored through the base 4, and are soldered to the external terminals 3 at the intersected portions. The work holes 19 are sealed by a sealing resin 9. The other structure is the same as in the Embodiment 1.

In the pressure sensor device having the above-explained structure, since the temperature sensor container 32 is formed separately from the base 4, it is only required to modify the design of the temperature sensor container 32 when the projected length of the temperature sensor container is changed, thus resulting in easy change in design.

Further, since the intermediate terminals 18 are not embedded in the base 4 when the latter is molded, the base 4 can be easily molded. Additionally, since a mold for forming the base 4 avoids becoming complicated, this embodiment is also effective in the case where multiple cavities, each for forming the base 4, are provided in one mold.

The pressure sensor device according to the first aspect of the present invention comprises: a pressure sensor including a pressure detecting element, which is disposed to define an enclosed pressure reference chamber and an enclosed pressure introducing chamber within an enclosure, and which is deformed depending on a pressure difference between the pressure reference chamber and the pressure introducing chamber for detecting the pressure of an object introduced into the pressure introducing chamber to be measured, a pipe connected to the pressure introducing chamber for introducing said object to be measured into the pressure introducing chamber from exterior, and leads for transferring an output of the pressure detecting element to the exterior; a circuit board on which the pressure sensor is mounted; a temperature sensor, including a heat sensitive element for detecting the temperature of said object and a pair of leads for introducing an output of the heat sensitive element to the exterior; a housing including a connector portion provided at an outer periphery thereof, molded integrally with a plurality of external terminals such that the plurality of external terminals have one set of ends extending out into the connector portion and the other ends extending to the interior of the housing, and disposed to cover the pressure sensor from above, the other ends of some of the external terminals being electrically connected to the circuit board, the other ends of some of the external terminals penetrating the circuit board and extending downward; and a resin-made base attached to the housing from below to define, jointly with the housing, a container space for containing the pressure sensor and the circuit board, the base including a pressure introducing passage which has one end air-tightly connected to the pipe and the other end open to the exterior, a temperature sensor containing projection projecting from the vicinity of the opening of the pressure introducing passage with the temperature sensor installed therein, work holes into which are inserted the other ends of those external terminals penetrating the circuit board and extending downward, and intermediate terminals having one set of ends electrically connected to the leads of the temperature sensor, the intermediate terminals being partly exposed in the work holes and electrically connected to the other ends of those external terminals inserted into the work holes. Thus, the temperature sensor is fixed to the base beforehand, then covered by the housing to be installed in the sensor container, and thereafter electrically connected to the external terminals through the work holes formed in the base. As a result, the temperature sensor can be surely fixed and positioned with a simple structure, and assembly work can be made so easy as to enable the pressure sensor device to be automatically assembled.

In the pressure sensor device according to the second aspect, the intermediate terminals serve as means for fixing the temperature sensor in the temperature sensor containing projection. Thus, since the intermediate terminals serve to position and fix the temperature sensor in place and are electrically connected to the external terminals, it is possible to avoid an increase in both the complexity of the structure and the number of parts. As a result, the pressure sensor device can be manufactured at lower cost.

In the pressure sensor device according to the third aspect, the temperature sensor is in the form of a temperature sensor body, formed by sealing the leads of the temperature sensor with a resin into a one-piece solid structure while exposing the heat sensitive element from the temperature sensor body. The temperature sensor is therefore strong and easy to handle, which is effective in improving the yield of temperature sensors.

In the pressure sensor device according to the fourth aspect, the temperature sensor body is insert-molded in the base to be integrally installed in the temperature sensor containing projection. Thus, the temperature sensor is integrally embedded in the base and surely positioned in place. As a result, variations in the response of the individual temperature sensors are eliminated and reliability is improved.

The pressure sensor device according to the fifth aspect comprises: a pressure sensor including a pressure detecting element, which is disposed to define an enclosed pressure reference chamber and an enclosed pressure introducing chamber within an enclosure, and which is deformed depending on a pressure difference between the pressure reference chamber and the pressure introducing chamber, for detecting the pressure of an object introduced into the pressure introducing chamber to be measured, a pipe connected to the pressure introducing chamber for introducing said object to be measured into the pressure introducing chamber from the exterior, and leads for transferring an output of the pressure detecting element to the exterior; a circuit board on which the pressure sensor is mounted; a temperature sensor body formed by installing a temperature sensor, which includes a heat sensitive element for detecting the temperature of said object and a pair of leads for introducing an output of the heat sensitive element to the exterior, in a resin-made cylindrical temperature sensor container equipped bottom with the heat sensitive element positioned at the bottom of the temperature sensor container; a housing including a connector portion provided at an outer periphery thereof, molded integrally with a plurality of external terminals such that the plurality of external terminals have one set of ends extending out into the connector portion and the other ends extending to the interior of the housing, and disposed to cover the pressure sensor from above, the other ends of some of the external terminals being electrically connected to the circuit board, the other ends of some of the external terminals penetrating the circuit board and extending downward; and a resin-made base attached to the housing from below to define, jointly with the housing, a container space for containing the pressure sensor and the circuit board, the base including a pressure introducing passage which has one end air-tightly connected to the pipe and the other end open to the exterior, a fitting hole which is bored in adjacent relation to the pressure introducing passage and into which the temperature sensor body is fitted, with the bottom side thereof extending out to the exterior, work holes into which are inserted the other ends of those external terminals penetrating the circuit board and extending downward, and intermediate terminals having one set of ends electrically connected to the leads of the temperature sensor, the intermediate terminals being partly exposed in the work holes and electrically connected to the other ends of those external terminals inserted into the work holes. It is therefore only required to modify the design of the temperature sensor container when the projected length of the temperature sensor container is changed, thus resulting in easy change in design.

In the pressure sensor device according to the sixth aspect, the intermediate terminals are insert-molded in the base. It is therefore possible to make the intermediate terminals fixed surely and to eliminate the work of attaching the intermediate terminals to the base in the assembly process.

In the pressure sensor device according to the seventh aspect, the intermediate terminals are fixed to the base by heat caulking. The intermediate terminals can be therefore fixed in place with a simple structure. Also, since the intermediate terminals are not embedded in the base when the latter is molded, the base can be easily molded. Further, since a mold for forming the base avoids becoming complicated, this aspect is also effective in the case where multiple cavities, each for forming the base, are provided in one mold.

In the pressure sensor device according to the eighth aspect, the intermediate terminals are fixed to the temperature sensor body. Thus, since there is no need of fixing the intermediate terminals to the base as an additional step, the structure can be simplified and the assembly work can be facilitated.

In the pressure sensor device according to the ninth aspect, the work holes are bored to vertically penetrate the base for connecting the container space and the exterior below the base with each other, and openings of the work holes, open at the underside of the base, are resin-sealed after the external terminals and the intermediate terminals have been electrically connected to each other. With this aspect, no water droplets stagnate in recesses of the enclosed portions of the work holes even if the sealing of the work holes is not perfect. As a result, water can be prevented from entering the interior of the sensor device and a failure in electrical insulation can be avoided.

In the pressure sensor device according to the tenth aspect, the work holes include conical portions with large-diameter ends formed to face the container space, and the intermediate terminals and the external terminals come close to each other in positions near small-diameter ends of the conical portions and are soldered in those positions for electrical connection. Therefore, the external terminals can be easily inserted into the work holes while being guided by the conical portions. Also, since the solders, applied to interconnect the external terminals and the intermediate terminals and leaked to the side of the circuit board, are pooled in the conical portions to avoid a short circuit between adjacent two of the external terminals, the soldering step can be easily performed and reliability is improved.

In the pressure sensor device according to the eleventh aspect, one of the leads of the temperature sensor is electrically connected to a circuit pattern formed on the circuit board through one of the corresponding external terminals, and the circuit board is configured such that the one lead of the temperature sensor can be alternatively connected to either a power supply terminal and a ground terminal by selectively short-circuiting between predetermined points on the circuit pattern through a short-circuit member. The pressure sensor device is therefore adaptable for two types of products with no need of changing the product structure.

What is claimed is:

1. A sensor device comprising:
    a pressure sensor having a pressure detecting element, a pipe, and first leads, wherein said pressure detecting element has an enclosed pressure reference chamber and an enclosed pressure introducing chamber within an enclosure and is deformed in accordance with a pressure difference between a pressure inside said pressure reference chamber and a pressure inside said pressure introducing chamber for detecting the pressure of an object to be measured introduced into said pressure introducing chamber, and wherein said pipe is connected to said pressure introducing chamber for introducing said object to be measured into said pressure introducing chamber from the exterior, and wherein said first leads transfer an output of said pressure detecting element to the exterior;
    a circuit board on which said pressure sensor is mounted;
    a temperature sensor having a heat sensitive element for detecting the temperature of said object to be measured and a pair of second leads for transferring an output of said heat sensitive element to the exterior;
    a housing having a connector portion provided at an outer periphery thereof, said connector portion molded integrally with a plurality of external terminals such that said plurality of external terminals has first ends extending into said connector portion and other ends extending into the interior of said housing, said other ends disposed above said pressure sensor, wherein ends in a first set of said other ends are electrically connected to said circuit board, and wherein ends in a second set of said other ends penetrate said circuit board and extend downward; and
    a resin-made base having a pressure introducing passage, a temperature sensor containing projection having an opening, work holes, and intermediate terminals, wherein said resin-made base is attached to said housing from below to define, jointly with said housing, a container space for containing said pressure sensor and said circuit board, and wherein said base includes a pressure introducing passage which has one end airtightly connected to said pipe and a second end open to the exterior, and wherein said temperature sensor containing projection projects from the vicinity of said opening of said pressure introducing passage with said temperature sensor installed therein, and wherein some of said second set of other ends are inserted into said work holes, and wherein said intermediate terminals have ends electrically connected to said second leads, and wherein said intermediate terminals are partly exposed in said work holes and are electrically connected to said second set of said other ends.

2. A sensor device as claimed in claim 1, wherein said intermediate terminals serve as means for fixing said temperature sensor in said temperature sensor containing projection.

3. A sensor device as claimed in claim 1, wherein said temperature sensor is in the form of a temperature sensor body formed by sealing said leads of said temperature sensor with a resin into a one-piece solid structure while extending and exposing said heat sensitive element from said temperature sensor body.

4. A sensor device as claimed in claim 3, wherein said temperature sensor body is insert-molded in said base to be integrally installed in said temperature sensor containing projection.

5. A sensor device comprising:
    a pressure sensor having a pressure detecting element, a pipe, and first leads, wherein said pressure detecting element is disposed to define an enclosed pressure reference chamber and an enclosed pressure introducing chamber within an enclosure and is deformed depending on a pressure difference between a pressure inside said pressure reference chamber and a pressure inside said pressure introducing chamber for detecting the pressure of an object to be measured introduced into said pressure introducing chamber; and wherein said pipe is connected to said pressure introducing chamber for introducing said object to be measured into said pressure introducing chamber from the exterior, and wherein said first leads transfer an output of said pressure detecting element to the exterior;
    a circuit board on which said pressure sensor is mounted;
    a temperature sensor body formed by installing a temperature sensor in a bottom of a resin-made cylindrical temperature sensor container so that a heat sensitive element is positioned at the bottom of said resin-made temperature sensor container, wherein said temperature sensor comprises said heat sensitive element for detecting the temperature of said object to be measured and a pair of second leads for transferring an output of said heat sensitive element to the exterior;
    a housing having a connector portion provided at an outer periphery of said housing, said connector portion molded integrally with a plurality of external terminals such that said plurality of external terminals have first ends extending into said connector portion and other ends extending to the interior of said housing, said other ends disposed above said pressure sensor, wherein ends in a first set of said other ends are electrically connected to said circuit board and ends in a second set of said other ends penetrate said circuit board and extend downward; and a resin-made base attached to said housing from below to define, jointly with said housing, a container space for containing said pressure sensor and said circuit board, said resin-made base having a pressure introducing passage which has one end air-tightly connected to said pipe and a second end open to the exterior, a fitting hole which is bored in an adjacent relation to said pressure introducing passage and into which said temperature sensor body is fitted with a bottom side of said temperature sensor body extending out to the exterior, work holes into which are inserted the other ends of those of said external terminals penetrating said circuit board and extending downward, and intermediate terminals having ends electrically connected to said second leads of said temperature sensor, wherein said intermediate terminals are partly exposed in said work holes and are electrically connected to said second set of said other ends.

6. A sensor device as claimed in claim 1, wherein said intermediate terminals are insert-molded in said base.

7. A sensor device as claimed in claim 1, wherein said intermediate terminals are fixedly disposed on said base by heat caulking.

8. A sensor device as claimed in claim 3, wherein said intermediate terminals are fixedly disposed on said temperature sensor body.

9. A sensor device as claimed in claim 1, wherein said work holes are bored to vertically penetrate said base for connecting said container space and the exterior below said base with each other, and wherein said work holes at the underside of said base are resin-sealed after said external terminals and said intermediate terminals have been electrically connected to each other.

10. A sensor device as claimed in claim 1, wherein said work holes have conical portions with large-diameter ends formed to face said container space, and wherein said intermediate terminals and said external terminals are disposed in proximity to each other in positions near small-diameter ends of said conical portions and are soldered in said positions for electrical connection.

11. A sensor device as claimed in claim 1, wherein one of said leads of said temperature sensor is electrically connected to a circuit pattern formed on said circuit board through a corresponding one of said external terminals, and wherein said circuit board is configured such that said one lead of said temperature sensor can be alternatively connected to one of a power supply terminal and a ground terminal by selectively short-circuiting between predetermined points on said circuit pattern through a short-circuit member.

* * * * *